(12) United States Patent
Biswas et al.

(10) Patent No.: US 9,815,026 B2
(45) Date of Patent: Nov. 14, 2017

(54) METHOD OF RECOVERY OF ORGANIC SOLVENTS REQUIRED IN REFINING OF COAL

(75) Inventors: Pinakpani Biswas, Jamshedpur (IN); Vimal Kumar Chandaliya, Jamshedpur (IN); Pradip Kumar Banerjee, Jamshedpur (IN)

(73) Assignee: Tata Steel Limited, Jamshedpur, Jharkhand (IN)

( * ) Notice: Subject to any disclaimer, the term of this patent is extended or adjusted under 35 U.S.C. 154(b) by 780 days.

(21) Appl. No.: 12/682,859

(22) PCT Filed: Jul. 6, 2009

(86) PCT No.: PCT/IN2009/000381
§ 371 (c)(1),
(2), (4) Date: Apr. 13, 2010

(87) PCT Pub. No.: WO2010/052735
PCT Pub. Date: May 14, 2010

(65) Prior Publication Data
US 2011/0179702 A1 Jul. 28, 2011

(30) Foreign Application Priority Data
Nov. 7, 2008 (IN) .............. 1981/KOL/2008

(51) Int. Cl.
*C10L 9/02* (2006.01)
*C10L 9/10* (2006.01)
*B01D 61/14* (2006.01)

(52) U.S. Cl.
CPC .............. *B01D 61/145* (2013.01); *C10L 9/02* (2013.01); *C10L 9/10* (2013.01); *B01D 2311/06* (2013.01)

(58) Field of Classification Search
CPC ........... C10L 5/02; B01D 21/00; B01D 21/02; B01D 21/262; B01D 23/00
(Continued)

(56) References Cited

U.S. PATENT DOCUMENTS 4,028,219 A 6/1977 Baldwin et al.
4,272,356 A * 6/1981 Stiller et al. .................. 208/424
(Continued)

FOREIGN PATENT DOCUMENTS

| JP | 58185682 A | 10/1983 | |
|----|-----------|---------|--|
| JP | 7305072 A | 11/1995 | |
| WO | WO 2008044728 A1 * | 4/2008 | ............... C10L 9/02 |

OTHER PUBLICATIONS

CeraMem Coroporation, Final Technical Report Deashing of Coal Liquids with Ceramic Membrane Microfiltration and Diafiltration, 1995, U.S. Department of Energy, pp. 1-18.*
(Continued)

*Primary Examiner* — Ellen McAvoy
*Assistant Examiner* — Ming Cheung Po
(74) *Attorney, Agent, or Firm* — The Webb Law Firm

(57) ABSTRACT

A method of recovery of organic solvents required in the refining of coal comprising: mixing solvent, co-solvent and coal to form a slurry; thermally treating the slurry under pressure and high temperature to form a coal-extract; passing the coal-extract through a membrane under high pressure in an ultra filtration unit to achieve recovery of a major part of the solvent; contacting the remaining thick clarified liquid from the membrane with water to obtain precipitated coal in a slurry with a mixture of water and organic solvent; feeding the slurry to a filter to get clean coal of very low ash content as a residue and a mixture of water and organic solvent as a filtrate; distilling the filtrate to separate the balance of the organic solvent from the water. The application of a mem-
(Continued)

brane for filtration minimizes the heat requirement to establish economy.

20 Claims, 1 Drawing Sheet

(58) Field of Classification Search
USPC .......................................................... 44/621
See application file for complete search history.

(56) References Cited

U.S. PATENT DOCUMENTS

| | | | |
|---|---|---|---|
| 5,256,297 A * | 10/1993 | Feimer et al. ................. | 210/651 |
| 2007/0256984 A1 * | 11/2007 | Benesi ................. | B01D 25/003 |
| | | | 210/741 |
| 2010/0006477 A1 * | 1/2010 | Okuyama ................. | C10L 9/10 |
| | | | 208/428 |

OTHER PUBLICATIONS

K. Renaganathan, J.W. Zondio, E.A. Mintz, P. Kneisi, A.H. Stiller, Preparation of an ultra-low ash coal extract under mild conditions, 2003, Fuel processing Technology, Abstract.*
CeraMem Corporation. Final technical Report Deashing of Coal Liquids with Ceramic Membrane Microfiltration and Diafiltration, 1995, U.S. Department of Energy, pp. 1-18.*
K. Renaganathan, J.W. Zondio, E.A. Mintz, P.Kneisi, A.H. Stiller, Preparation of an ultra-low ash coal extract under mild conditions, 2003, Fuel processing Technology, Abstract.*

* cited by examiner

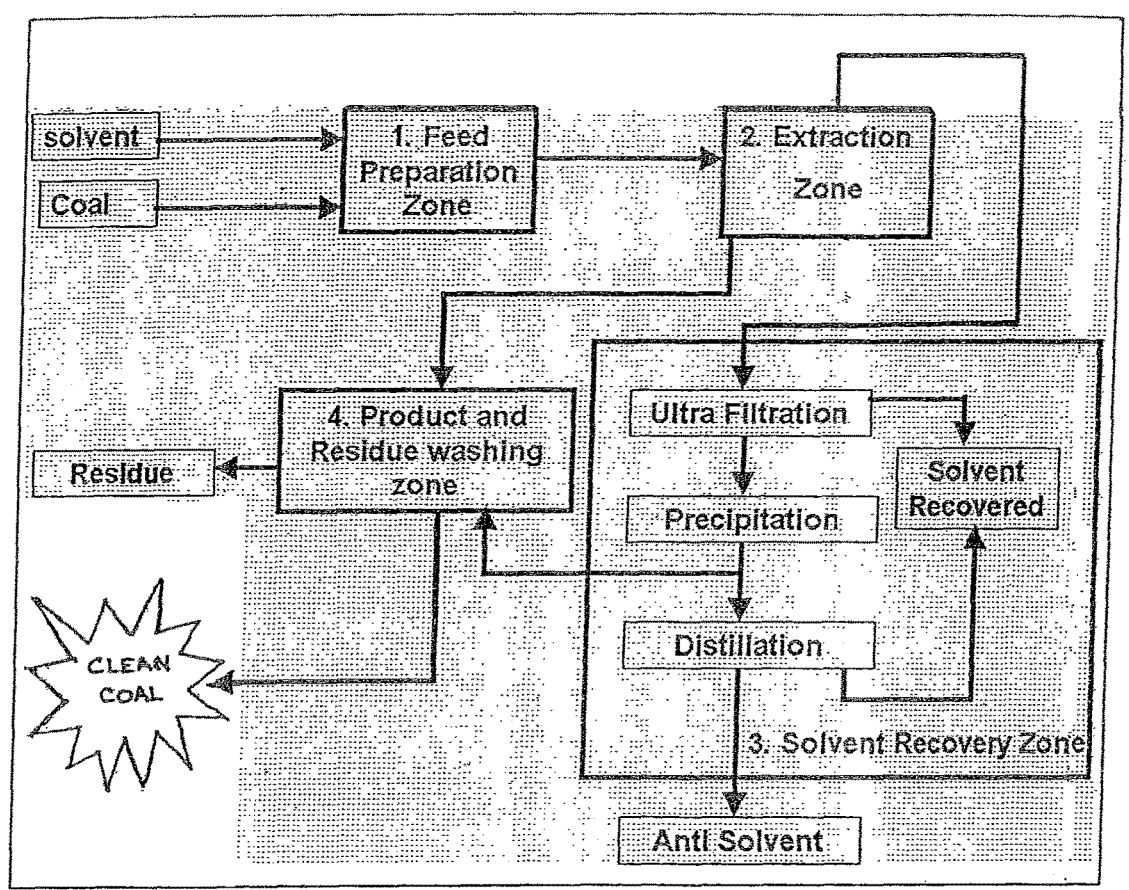

METHOD OF RECOVERY OF ORGANIC SOLVENTS REQUIRED IN REFINING OF COAL

BACKGROUND OF THE INVENTION

Field of the Invention

The invention generally relates to refining coal using organic solvents, and to a process of separation of coal from organic solvents completely for recovering the said solvents, which are used for extraction.

Description of the Related Art

The related art operation invokes separation of coal from organic solvents. Organic-refining or, solvent-refining or, solvent extraction of coal is a well-established technology. Abundant literature is available on the subject. However, the primary objective in most of those cases is to provide a process to produce ultra clean coal or super clean coal with an ash content of less than 4%. The ash content of the parent coal (Run of Mine) is 25%. Exploratory study revealed that it is possible to extract 50% of parent coal through this process of extraction of coal under reflux conditions at atmospheric pressure. The resulting coal contains almost 4% ash.

The yield and the ash content of super clean coal are satisfactory and it encourages for up scaling the process to bench scale set up. The main concerning factor apart from yield is the economic viability of the process. The process consumes a significant amount of heat for extraction. Also, recovery of the solvent has been achieved by the consumption of a large amount of heat. A combination of the above two heat inputs drives the process towards infeasibility. Now, if the two heat consumptions are arranged in priority basis, then heat consumption for extraction has the higher priority because the extraction process solely depends upon the extraction temperature. This is why it is often called thermal extraction so only the heat requirement for solvent recovery is left for minimization. There is a need for an effective or optimized design of solvent recovery to minimize the heat requirement for solvent recovery and thus establish feasibility of the process.

SUMMARY OF THE INVENTION

To overcome the drawbacks of the prior art, the following innovative remedial measures were undertaken:

A primary object of the invention is to propose a method of recovery of organic solvents required (for the extraction) in refining the coal.

Another object of the invention is to propose an innovative approach to separate coal from organic solvent as completely as possible while minimizing energy required. Still another object of the invention is to introduce an economical chemical coal beneficiation process without using any evaporation unit for producing clean coal and to increase recovery of solvents.

According to the innovative design, coal is separated from "coal extract" by ultra filtration. The "coal extract" is formed by thermal treatment of coal with organic solvent. The hot coal "coal extract" is then cooled and passed through a membrane having a diameter of 0.2 micron or less. The filtrate coming from the membrane is free from coal which is proved by the addition of water. That is, if the permeate contained coal, then addition of water would cause coal to be precipitated which does not happen at all. This observation strongly evidences the inexistence of coal in permeates. It proves that the "coal extract" can be well separated by membrane operation and it produces pure solvent as permeate from the membrane. The thick clarified solution from the top of the membrane is then sent to another unit for usual operation. The new process has been developed which is very flexible to produce clean coal of desired ash level (0.1 to 10%) with satisfactory yield.

BRIEF DESCRIPTION OF THE DRAWING

FIG. 1 is a schematic diagram showing the operation of the process according to the invention.

DETAILED DESCRIPTION OF THE INVENTION

The invention will now be described with help of the accompanying drawing which depicts exemplary embodiments of the invention. However, there can be several other embodiments, all of which are deemed covered by this description.

I) Feed Preparation Zone 1.

Coal, solvent and co-solvent are mixed thoroughly in a feed preparation zone. The ratio of coal to solvent ratio is maintained at 1:18 in the feed preparation zone.

II) Extraction Zone 2.

Coal slurry is then pumped to a reactor. In the reactor a temperature of around 200° C. to 250° C. is maintained by circulating hot thermic fluid. A high pressure is maintained by inducing a high pressure of about 2 to 4 atm inside the reactor. The high pressure elevates the boiling point of the solvent. Residence time in the reactor may vary from 1 h to 1.5 h and may be dictated by the economics of the process and its specific requirement of a given coal. Extracted coal-solvent mixture is then fed to a high temperature filter. From the filter, the residue is taken off and sent to a product and residue washing zone 4 and the filtrate is sent to a solvent recovery zone 3.

III) Solvent Recovery Zone 3.

The filtrate containing coal extracts and is then fed to a membrane unit for ultra filtration. In the membrane unit a high pressure pump filtration is done and the permeates are collected from the membrane are free from coal which is proved by observing no further precipitation with the addition of water to the permeate. So by incorporation of the membrane, 80% of the solvent is further collected without applying any heat. The thick clarified liquid from the membrane is then fed to a precipitating tank where coal is precipitated as water acts as an anti-solvent.

The amount of water needed in the precipitation tank is much less because 80% of the solvent is already removed. This slurry (water+solvent+coal) becomes filtered by another rotary drum filter and the super clean coal is then sent to a product washing unit. The filtrate contains water and organic mixture which is fed to a distillation unit and water and 19% organic solvent are separated. So this methodology gives us almost 99% solvent recovery with negligible energy consumption, thus established the feasibility of the process.

IV Final Product and Residue Washing Zone 4.

The final operation unit is the product and residue washing unit. The super clean coal is collected from solvent recovery zone and is washed here thoroughly and stored.

Residue collected from the extraction zone is washed properly for removing trace amounts of solvent and stored for later use.

So in this way the whole process operation achieves 99% solvent recovery while minimizing the energy requirement, is accomplished with 50% super clean coal having ash percentage less than 4%.

The following optical density results provide further support:
1. NMP (n-methyle pyrollidone) OD=0
2. Recycle Solvent OD+0
3. COAL Extract OD+4

As the optical density of pure NMP is zero and the coal extract is 4, it proves that the "coal extract" must contain very fine particles which can be separated by applying the membrane.

The following results are the strong evidence of coal suspension in organic solvent. Actually the coal extract is very fine coal particles distributed in liquid organic phase. The particle size distribution has started approximately from 25 micron to nano size or may be less than that. The major portion of coal particles can be separated by passing through the membrane unit. A portion of the coal extract has been passed through ceramic membrane having pore diameter of 0.2 micron. The permeate coming from the membrane is totally free of coal and this has been proved, as there is no further precipitation observed by adding a sufficient amount of water. If coal were there in permeate then adding water would cause coal to be separated out as it happened in our earlier process.

An important safety measures comprises:
a. As the solvents of use are organic and flammable in nature, they may catch fire if contacted with oxygen at high temperatures. Therefore, there is provision for Nitrogen flashing in the reactor and the Rotary drum filter unit.

The main advantages of the invention achieved include:
i. Recovery of solvent increases without using any thermal energy which improves the economics remarkably.

The invention claimed is:

1. A method of recovery of organic solvents required in a process for producing clean coal, consisting of the following steps:
feeding at least an organic solvent and coal into a feed preparation unit for mixing thoroughly to form a slurry;
pumping the slurry to a reactor in an extraction unit wherein the slurry is thermally treated under pressure and allowed to settle therein for a total of specified residence time for the treatment to have all mineral matters settled, forming a coal-extract;
filtering the thermally treated slurry to separate coal-extract from a residue, the filtered coal-extract having coal particles suspended in the organic solvent;
passing the separated coal-extract to an ultra filtration unit of a solvent recovery zone to recover a major part of the solvent from the coal-extract by permeating the solvent through a membrane, wherein the permeate is substantially free from extracted coal as determinable by observation of no precipitation upon addition of water to the permeate, wherein the remainder of the coal-extract that did not permeate through the membrane is a thick clarified liquid;
feeding the thick clarified liquid from the membrane to a precipitation tank residing in the solvent recovery zone and contacting it with water to obtain precipitated coal in a slurry with a mixture of water and organic solvent;
feeding the slurry into a drum filter to get clean coal of very low ash content as a residue and a mixture of water and organic solvent as a filtrate; and
sending the filtrate to a solvent recovery unit for distillation to separate the balance of the organic solvent from the water,
wherein the use of the membrane in the process of achieving clean coal of very low ash content and complete separation and recovery of organic solvent from the thermally treated coal minimizes the heat requirement to establish economy.

2. The method according to claim 1, wherein the slurry is thermally treated in the range of 200° C.-250° C.

3. The method according to claim 1, wherein the thermal treatment of the slurry is carried out under pressure in the range of 2-4 atm.

4. The method according to claim 1, wherein the total specified time of residence in the reactor ranges from 1 hour to 1.5 hours.

5. The method according to claim 1, wherein said major part of the solvent recovered through the membrane in the ultra filtration unit is 75-80%.

6. The method according to claim 5, wherein said membrane is a ceramic membrane having a pore diameter of up to 0.2 micron.

7. The method according to claim 1, wherein said clean coal of very low ash content has an ash content which is in the range of 0.1-10%.

8. The method according to claim 1, wherein said balance of recovery of the organic solvent is 10-20%.

9. The method according to claim 1, wherein said complete recovery of the solvent is 97-99%.

10. A method of recovery of organic solvents required in a process for producing clean coal, consisting of the following steps:
mixing at least an organic solvent and coal to form a slurry;
thermally treating the slurry under pressure in a reactor to form an extracted coal-solvent mixture and a mineral residue;
filtering the thermally treated slurry to separate the extracted coal-solvent mixture from the residue, the filtered extracted coal-solvent mixture having coal particles suspended in the organic solvent;
recovering a major part of the organic solvent from the extracted coal-solvent mixture by permeating the organic solvent through a membrane, wherein the permeate is substantially free from extracted coal as determinable by observation of no precipitation upon addition of water to the permeate, wherein the remainder of the extracted coal-solvent mixture that did not permeate through the membrane is a concentrated extracted coal-solvent mixture;
contacting water to the concentrated extracted coal-solvent mixture to obtain precipitated coal in a slurry with a mixture of water and organic solvent;
filtering the slurry to separate the precipitated coal from the mixture of water and organic solvent; and
recovering a balance of the organic solvent from the mixture of water and organic solvent by separating the water and organic solvent using distillation.

11. The method according to claim 10, wherein the thermal treatment of the slurry is carried out at a temperature in the range of 200° C.-250° C.

12. The method according to claim 10, wherein the thermal treatment of the slurry is carried out under pressure in the range of 2-4 atm.

13. The method according to claim 10, wherein a total specified time of residence in the reactor ranges from 1 hour to 1.5 hours.

14. The method according to claim 10, wherein said major part of the solvent recovered through the membrane is 75-80%.

15. The method according to claim 10, wherein said membrane is a ceramic membrane having a pore diameter of up to 0.2 micron.

16. The method according to claim 10, wherein said precipitated coal has an ash content which is in the range of 0.1-10%.

17. The method according to claim 10, wherein said balance of recovery of the organic solvent is 10-20%.

18. The method according to claim 10, wherein said complete recovery of the solvent is 97-99%.

19. The method according to claim 1, wherein the permeate from the membrane is free of coal.

20. The method according to claim 10, wherein the permeate from the membrane is free of coal.

* * * * *